United States Patent
Falbe et al.

[15] 3,681,465
[45] Aug. 1, 1972

[54] PROCESS OF PRODUCING ALDEHYDES USING A CATALYST INCLUDING A GROUP VIII METAL AND PHOSPHORUS

[72] Inventors: Jurgen Falbe, Dinslaken; Hans Tummes, Oberhausen-Sterkrade-Nord; Jurgen Weber, Oberhausen-Holten, all of Germany

[73] Assignee: Ruhrchemie Aktiengesellschaft, Oberhausen-Holten, Germany

[22] Filed: Nov. 1, 1968

[21] Appl. No.: 772,612

[30] Foreign Application Priority Data

Nov. 7, 1967  Germany............P 16 68 622.9
Sept. 2, 1968  Austria....................A 8496/68

[52] U.S. Cl..........................260/604 HF, 260/927 R
[51] Int. Cl........C07c 45/08, C07c 45/10, C07f 9/28
[58] Field of Search.......................260/604 HF, 927

[56] References Cited

UNITED STATES PATENTS 3,351,666  11/1967  Mertzweiler et al...260/604 HF
3,496,204  2/1970  Morris et al.........260/604 HF X

*Primary Examiner*—Joseph Rebold
*Assistant Examiner*—Richard L. Raymond
*Attorney*—Burgess, Dinklage & Sprung

[57] ABSTRACT

In the production of aldehydes by reaction of carbon monoxide, hydrogen, and olefinically unsaturated compounds, utilizing a catalyst based on a Group VIII metal, e.g. cobalt, which catalyst includes as an additive, a phosphorus compound, the performance of the catalyst is improved, particularly in that high yields are obtained without the increase of reaction time commonly occasioned by use of a phosphorus compound, by using a phosphorus compound of the formula, for example:

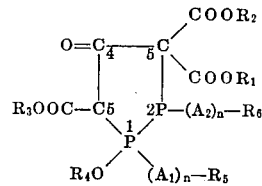

wherein $R_1$, $R_2$, $R_3$, $R_4$, $R_5$ and $R_6$ are the same or different non-substituted or substituted aliphatic, cycloaliphatic, heterocyclic or aromatic radicals, $A_1$ and $A_2$ represent similar or different bridge atoms selected from the group comprising oxygen, sulfur, nitrogen and phosphorus and $n$ is an integer having a value of 0 or 1 and even 2 if the bridge atom is sulfur, nitrogen or phosphorus.

26 Claims, 1 Drawing Figure

PATENTED AUG 1 1972  3,681,465
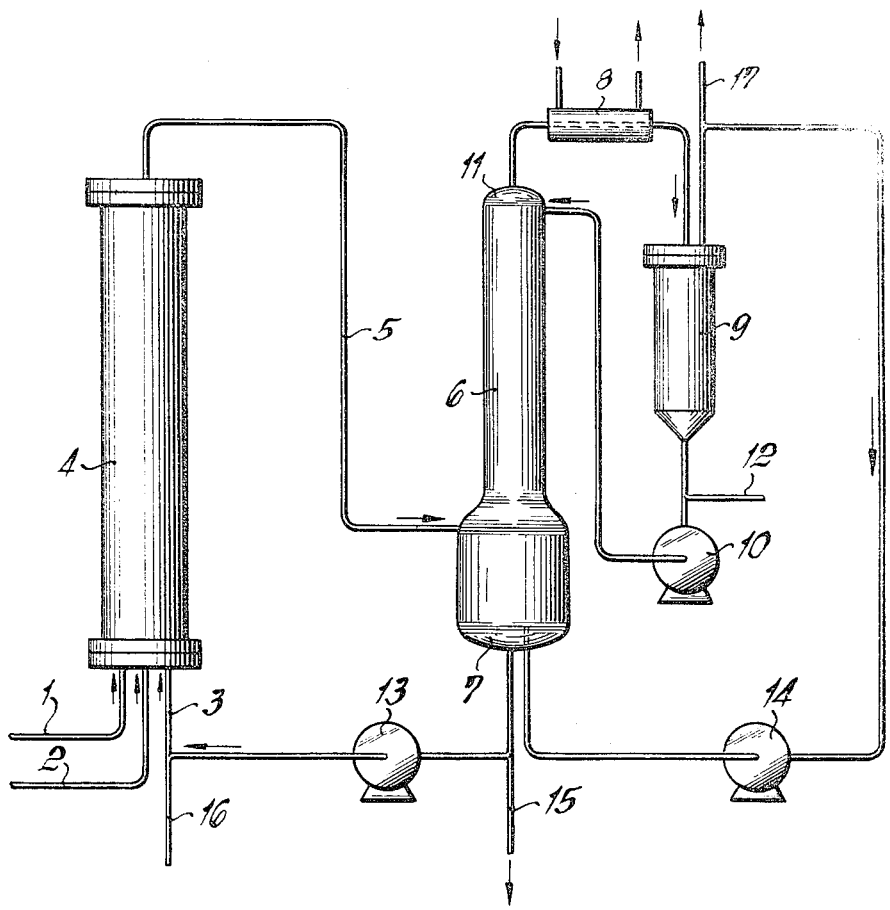
Jurgen Falbe
Hans Tummes
Jurgen Weber
INVENTORS
Burgess Ryskleg &
Sprung
ATTORNEYS

PROCESS OF PRODUCING ALDEHYDES USING A CATALYST INCLUDING A GROUP VIII METAL AND PHOSPHORUS

BACKGROUND OF THE INVENTION

The production of aldehydes by the addition of carbon monoxide and hydrogen to olefinically unsaturated compounds in the presence of a catalyst, whereby aldehydes having one more carbon atom than the olefinic compound are obtained, is well known in the art (see J. Falbe, Synthesen mit Kohlenmonoxyd, 1967, page 3 ff). This reaction, the so-called oxosynthesis, is industrially achieved with some types of catalysts, among which cobalt is preferred. It can be employed in different forms (see Falbe, l.c., page 13 ff). The oxosynthesis can also be carried out with other metals, for instance rhodium, ruthenium or iron, as is well known in the art (see Falbe, l.c., page 21 ff).

Under the reaction conditions of the oxo-synthesis using cobalt in any form, cobalt carbonyl hydride, which is the active catalyst, is formed. The oxo process is generally conducted at temperatures between 100° and 200° C and total pressures from 100 to 400 atm.

In addition to the aldehydes, which are obtained as the primary products, significant amounts of by-products are formed, as for instance alcohols, resulting from the hydrogenation of the said aldehydes. Furtheron, formic acid esters and higher boiling condensation products of the primaryly formed aldehydes are formed besides other substances. Some hydrogenation of the olefinic compounds, used as starting materials, to corresponding saturated reaction products also takes place.

Since at the hydroformylation of most olefinic starting material (insofar as they are not symmetric and not isomerizable by migration of the double linkage, as for instance ethylene and cyclopentene), isomerizations of the complexes intermediaryly formed from the respective olefinic compound and the carbonyl occur under the prevailing reaction conditions, mixtures of several isomeric reaction products are generally obtained.

One embodiment of the oxo synthesis is known, whereby complexes from distinct phosphines, carbon monoxide and transition metals, as for instance cobalt, rhodium and so on, are employed as catalysts (see DAS 1 186 455 and DAS 1 212 953). With this known method, the reaction shall be conducted under pressures of 35 to 150 atm and at temperatures from 160° to 200° C. It is said, that hereby a higher ratio of normal to branched aldehydes and/or normal to branched alcohols is obtained from normal olefines than can be obtained with metal catalysts, especially cobalt catalysts, without addition of phosphines. Furtheron, it has been stated, that the said process results in the hydrogenation of remarkable amounts of the primarily formed aldehydes to alcohols. The undesired formation of higher boiling condensation products is reduced in comparison to processes operating with cobalt catalysts without added phosphorus compounds.

A disadvantage inherent in this embodiment of the oxo synthesis is, that generally more than 10 percent of the olefinic compounds used as starting materials are hydrogenated to saturated hydrogenation products and that a significant decrease of the reaction velocity must be tolerated. Owing hereto, larger sized reaction vessels are necessary, if equal throughputs as can be obtained with phosphine-free catalysts shall be attained.

It is also known to employ phosphites instead of phosphines as additional catalysts together with cobalt catalysts (see DAS 1 146 486 and DAS 1 230 010). With the addition of phosphites, the hydrogenation of aldehydes primarily formed to corresponding alcohols shall be significantly reduced, but the added phosphites also lead to a decrease of the reaction velocity of the synthesis in comparison with the use of cobalt catalysts containing no phosphine or phosphit additives.

THE INVENTION

It is an object of the invention, to convert olefins to aldehydes with high yields in presence of oxo synthesis catalysts containing an addition of phosphorus compounds whereby a decrease of the reaction velocity is substantially avoided.

It has now been found, that the production of aldehydes by reaction of olefinic compounds with carbon monoxide and hydrogen at elevated temperature and elevated pressure in presence of catalysts containing a metal of Group VIII of the periodic system (i.e. a transition metal) can be formed with excellent results, if a compound is added to the catalyst which has been prepared by reaction of malonic acid diesters with compounds of trivalent phosphorus, which contain directly linked to the phosphorus atom at least two halogen atoms, e.g. chloro, capable of reacting with activated hydrogen atoms. The phosphorus compound can have two halogen atoms, e.g. chloro, and as a third substituent an organic group, e.g. an aromatic or alkyl group connected directly or through —O—, —S—, —N— or —P— to the phosphorus.

Especially well suited as catalyst additives are compounds of the general formula

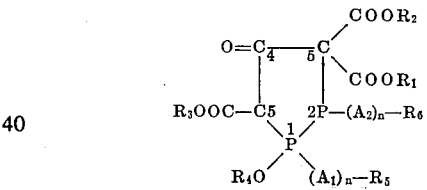

wherein $R_1$, $R_2$, $R_3$, $R_4$, $R_5$ and $R_6$ are the same or different non-substituted or substituted aliphatic, cycloaliphatic, heterocyclic or aromatic radicals, $A_1$ and $A_2$ represent similar or different bridge atoms selected from the group comprising oxygen, sulfur, nitrogen and phosphorus and $n$ is an integer having a value of 0 or 1 and even 2 if the bridge atom is sulfur, nitrogen or phosphorus. More particularly the groups $R_1$, $R_2$, $R_3$ and $R_4$, each can be alkyl, especially lower alkyl (up to four carbon atoms); $R_5$ and $R_6$ each can be alkyl or a phenyl group of the formula

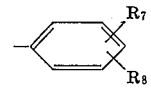

wherein each $R_7$ and $R_8$ is hydrogen, halo, alkyl, especially lower alkyl, amino, alkyl amino, especially lower alkyl amino, dialkylamino, especially di-lower alkyl amino; and each $A_1$ and $A_2$ each can be oxygen, imido, especially alkyl imido, e.g. lower alkyl amido, and $n$ can be 0 or 1.

In another embodiment of the invention compounds of the general formulas

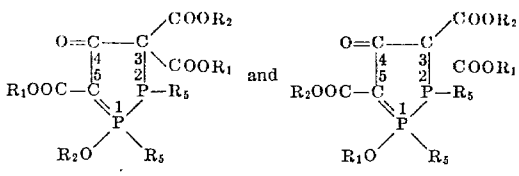

are used as catalyst additives. Herein $R_1$, $R_2$ and $R_5$ can have the values assigned thereto above.

Advantageous results are further obtained, if compounds of the general formula

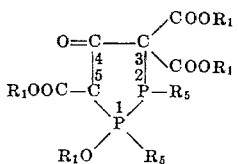

are used as catalyst additives. In the said formula $R_1$, $R_2$ and $R_5$ can have the values assigned thereto above.

Under the conditions of the oxo synthesis the catalytic compounds containing a transition metal of Group VIII of the periodic table are converted to corresponding carbonyl compounds, which form complexes with the phosphorus compounds added according to the invention; the resulting complexes are more resistant to high temperature and less volatile in comparison to simple carbonyl compounds.

The catalysts used in the process of the invention effect a pronounced selectivety for the formation of aldehydes. Hydrogenation of the olefinic starting materials to corresponding saturated compounds as well as hydrogenation of the resulting aldehydes to alcohols is substantially suppressed. A further valuable aspect of the process according to the invention resides in its ability to decrease significantly the formation of other undesired side products, as for instance formic acid esters, in comparison with conventional processes. A supplemental increase of the aldehyde yield, which however in certain instances is connected with a decrease of the reaction velocity, can be attained by addition of alkali hydroxides to the catalyst system. Addition of tertiary amines, if desired together with alkali hydroxide, can also effect a further increase of the aldehyde yield.

The process according to the invention has significant advantages in comparison to known processes working with conventional catalysts as for instance cobalt carbonyl compounds in absence of additives due to the fact, that the phosphorus compounds used as catalyst additives don't remarkably impair the velocity of the hydroformylation reaction. In contrast hereto, the hitherto used phosphorus containing catalyst additives cause a remarkable decrease of the reaction velocity resulting in a decrease of the yield of valuable products obtainable per unit of time in reaction vessels of identical size.

Outstanding results are obtained, if the phosphorus containing compounds used according to the process of the invention are applied together with catalysts containing cobalt, rhodium, ruthenium or iron.

Several individual compounds, which are typical examples for suitable catalyst additives are hereinafter listed.

TABLE 1

1. 1-ethoxy-1,2-diphenyl-[1,2-diphosphacyclopenten-(5)-one-(4)] tricarboxylic acid-(3,3,5)-triethylester
2. 1-ethoxy-1,2-di-(4'-chloro-phenyl)-[1,2-diphosphacyclopenten-(5)-one-(4)]-tricarboxylic acid-(3,3,5)-triethylester
3. 1-ethoxy-1,2-di-(4'-methyl-phenyl)-[1,2-diphosphacyclopenten-(5)-one-(4)]-tricarboxylic acid-(3,3,5)-triethylester
4. 1-ethoxy-1,2-di-(4'-dimethylamino-phenyl)-[1,2-diphosphacyclopenten-(5)-one-(4)]-tricarboxylic acid-(3,3,5)-triethylester
5. 1-ethoxy-1,2-di-(4'-fluoro-phenyl)-[1,2-diphosphacyclopenten-(5)-one-(4)]-tricarboxylic acid-(3,3,5)-triethylester
6. 1-ethoxy-1,2-di-(2'-tert,-butyl-phenoxy)-[1,2-diphosphacyclopenten-(5)-one-(4)]-tricarboxylic acid-(3,3,5)-triethylester
7. 1-ethoxy-1,2-di-(2',5'-dimethyl-phenyl)-[1,2-diphosphacyclopenten-(5)-one-(4)]-tricarboxylic acid-(3,3,5)triethylester
8. 1-ethoxy-1,2-di-(N-methyl-anilino)-]1,2-diphosphacyclopenten-(5)-one-(4)]-tricarboxylic acid-(3,3,5)-triethylester
9. 1-methoxy-1,2-diphenyl-[1,2-diphosphacyclopenten-(5)-one-(4)]-tricarboxylic acid-)3,3,5)-trimethylester
10. 1-tert.-butoxy-1,2-diphenyl-[1,2-diphosphacyclopenten-(5)-one-(4)]tricarboxylic acid-(3,3,5)-tri-tert.-butylester
11. 1-tert.-butoxy-1,2-di-(4'-dimethylamino-phenyl)-[1,2-di-phosphacyclopenten-(5)-one-(4)]-tricarboxylic acid-(3,3,5)tri-tert.-butylester
12. 1-ethoxy-1,2-di-n-butyl-[1,2-diphosphacyclopenten-(5)-one-(4)]-tricarboxylic acid-(3,3,5)-triethylester The hereinbefore listed derivatives of 1,2-diphosphacyclopenten-(5)-one-(4) can for instance be prepared by reaction of malonic acid diesters with compounds of trivalent phosphorus having directly linked to the phosphorus atom at least two halogen atoms capable of reacting with activated hydrogen atoms, whereby hydrogen chloride evolved during the reaction is continuously removed from the reaction mixture by addition of a base, as for instance a tertiary amine. The substituent $(A_1)n R_5$ or $(A_2)n R_6$ of the first of the above structural formulas can be the third substituent of the trivalent phosphorus compound. The course of the reaction will be apparent from the foregoing structural formula. The conversion between the reactants proceeds at ambient or slightly increased temperature, it is advantageously carried out at 40° to 60° C. In special instances, as for example with steric hindered reactants, higher temperatures may be required. Preparation of compound 1 of Table 1 is disclosed in copending application Ser. No. 765,687 filed Oct. 7, 1968 of Gunter Bergerhoff, Bela Tihanyi, Jurgen Falbe and Jurgen Weber, for Phenyl-Substituted Phosphorus Compound And Process For Its Preparation. The following example appears in said copending application.

EXAMPLE:

17.9 g phenyl-phosphine dichloride (0.1 mole) and 16.0 g malonic acid diethylester (0.1 mole) are dissolved in 250 ml benzene and heated to 50° C under a nitrogen atmosphere. 20.2 g (0.2 mole) triethylamine, dissolved in 100 ml benzene are added dropwise under stirring. Precipitated triethylamine hydrochloride is separated by filtration and washed with benzene. The benzene filtrate together with the washing solution is concentrated to about one third of its volume by evaporation at 40° to 50° C under water-jet vacuum. Thereby a colorless crystal sludge is precipitated which is sucked off and washed with ether. This product can be purified by recrystallization from benzene followed by washing with alcohol and ether. The pure compound has a melting point of 114° C. The entire yield amounts to 70 to 80 percent by theory.

The catalysts are applied in amounts generally used in oxo-synthesis processes. Cobalt and ruthenium for example are used in concentrations of about 0.01 to 5 percent by weight, preferably 0.1 to 1.5 percent by weight of metal related to the olefinic compound to be converted. Rhodium is generally applied in a concentration of 0.00001 to 0.5 percent by weight, preferably 0.001 to 0.1 percent by weight of Rh, related to the amount of the olefinic compound to be reacted. The atomic ratio of metal to phosphorus generally ranges between 1:0.5 to 1:10, preferably 1:0.5 to 1:3. If desired, metal and phosphorus may be applied in an atomic ratio, which is higher or lower than the hereinbefore stated values.

The process according to the invention is advantageously carried out at pressures in the range from 50 to 400 Atm, preferably from 150 to 300 Atm, a molar ratio of carbon monoxide to hydrogen from 1:5 to 5:1, preferably 1:1 is maintained. The reaction temperature ranges from 70° to 250° C, preferably from 90° to 180° C. In this regard it must be considered, that the aldehyde yield is temperature dependent. The amount of aldehydes in the reaction product related to the olefinic starting material increases with decreasing reaction temperature while simultaneously a decrease of the reaction velocity is observed. It is essential to effect the reaction at low temperatures, if normal olefins shall be converted to unbranched reaction products.

The reaction of olefins with carbon monoxide and hydrogen according to the process of the invention may be effected in presence as well as in absence of inert solvents or diluents. Suitable solvents are for instance aliphatic, cycloaliphatic or aromatic hydrocarbons, ethers, esters, ketones or the reaction product itself or fractions thereof as for example higher boiling residues, preferred solvents are hexane, octane, cyclohexane, benzene, toluene, xylene, diphenylether, tetrahydrofurane or mixtures of those substances.

The reaction may be conducted discontinuously or preferably continuously. Due to the outstanding thermal stability and the low volatility of the complexes formed in the reaction mixture from metal carbonyl compounds and the phosphorus containing compounds, the reaction product can be separated from the catalyst in simple manner. The separation is performed in such a manner, that the catalyst remains in the sump phase and can be recirculated in liquid phase, if desired after replenishment of small losses by fresh catalyst.

The following examples 1–18 illustrate the discontinuous hydroformylation of olefins with the process according to the invention; examples 1 to 17 being concerned with conversions in presence of cobalt catalysts, while example 18 illustrates the use of a rhodium catalyst. Examples 19 and 20 describe continuous hydroformylation processes.

EXAMPLES 1 to 17

A 2.1 l stainless steel autoclave (V4A) equipped with a lifting magnet stirrer was charged with 300 g benzene, 3.45 g dicobaltoctacarbonyl respectively and, except in comparison test 1, individual phosphorus containing additional catalysts noted in table 1 as well as KOH if desired were added. The phosphorus compound was thereby employed in an amount corresponding to an atomic ratio Co:P = 1:1.1.

The autoclave contents were heated up to the respective temperatures noted in table 1 in presence of CO and $H_2$ in a ratio of 1:1, and under a pressure of 250 atm., 150 g hexene-(1) were introduced into the autoclave with the aid of a pressure dosing pump. The synthesis gas consumed during the course of the reaction was continuously replenished by means of an automatic pressure regulating equipment, so that pressure drop in the autoclave was prevented. The course of the reaction was controlled by regular sampling and gas chromatographic analysis. After completion of the reaction, the autoclave was discharged and the composition of the reaction product was determined by vacuum distillation and gaschromatographic analysis.

The test results are summarized in the attached table, wherein the phosphorus compounds employed as catalyst additives are characterized by numerals corresponding with the numeration of the individual compounds listed as typical examples in Table 1.

TABLE 2

Hydroformylation of Hexene-1)

| Reaction conditions: | pressure | : 250 atm. | Co-concentration | : 0.8% by weight related to olefinic starting material |
| --- | --- | --- | --- | --- |
| | molar ration $H_2$:CO | : 1:1 | atomic ration Co:P | : 1:1.1 |
| | solvent | benzene | weight ratio solvent:olefin | : 2:1 |

| Test No. | Catalyst | Temp °C | yields: from 100 g hexene-(1) are obtained (in g) | | | | higher boiling constituents | reaction time (in h) up to 95% conversion |
| --- | --- | --- | --- | --- | --- | --- | --- | --- |
| | | | aldehydes | alkohols | formic acid esters | paraffins | | |
| 1 | $Co_2(CO)_8$ | 170 | 74.2 | 25.0 | 11.1 | 2.5 | 23.0 | 1 |
| 2 | $Co_2(CO)_8$ + Triphenylphosphite | 170 | 115.8 | 6.8 | 4.1 | 2.2 | 7.3 | 3 |
| 3 | $Co_2(CO)_8$ + Tributylphosphine | 170 | 63.8 | 43.8 | 16.2 | 8.2 | 5.1 | 2 |
| 4 | $Co_2(CO)_8$ + P-compound 1 | 170 | 123.4 | 2.6 | 1.3 | 2.3 | 5.9 | 1.5 |
| 5 | $Co_2(CO)_8$ + Tributylphosphine + 1 mol KOH/ gramatom P | 170 | 61.1 | 29.5 | 33.1 | 10.2 | 6.0 | >5 |
| 6 | $Co_2(CO)_8$ + P-compound 1 + 1 mol KOH gra- | | | | | | | |

| | | | | | | | |
|---|---|---|---|---|---|---|---|
| 7 | matom P Co₂(CO)₈ + P-compound 1 + 2 mol KOH /gramatom P | 170 | 126.7 | 1.8 | 0.9 | 2.0 | 4.0 | 3 |
| 8 | Co₂(CO)₈ + P-compound 3 | 170 | 129.6 | 1.4 | 0.8 | 1.4 | 2.3 | 3 |
| 9 | Co₂(CO)₈ + P-compound 3 + 1 mol KOH /gramatom P | 170 | 120.8 | 3.1 | 2.9 | 2.3 | 6.5 | 1.5 |
| 10 | Co₂(CO)₈ + P-compound 2 | 170 | 125.0 | 4.2 | 1.5 | 2.7 | 1.7 | 1.5 |
| 11 | Co₂(CO)₈ + P-compound 2 + 1 mol KOH /gramatom P | 170 | 115.3 | 8.0 | 3.4 | 2.1 | 7.1 | 2.5 |
| 12 | Co₂(CO)₈ + P-compound 7 | 170 | 119.4 | 6.4 | 2.1 | 2.9 | 4.6 | 3.5 |
| 13 | Co₂(CO)₈ + P-compound 4 | 170 | 120.0 | 2.6 | 2.5 | 2.6 | 6.8 | 1 |
| 14 | Co₂(CO)₈ + P-compound 11 | 170 | 125.5 | 1.8 | 1.4 | 2.8 | 3.0 | 1.2 |
| 15 | Co₂(CO)₈ + P-compound 12 | 170 | 122 | 2.3 | 2.1 | 3.2 | 5.3 | 1 |
| 16 | Co₂(CO)₈ + P-compound 1 | 150 | 123.0 | 1.5 | 1.8 | 2.2 | 6.3 | 1 |
| 17 | Co₂(CO)₈ + P-compound 1 | 120 | 127.3 | 0.8 | 1.5 | 1.6 | 4.0 | 2 |
| | | 90 | 131.0 | 0.2 | 1.4 | 1.1 | 2.1 | 6.5 |

EXAMPLE 18

A 4 l stainless steel autoclave (V4A) equipped with a lifting magnet stirrer was charged with 800 g toluene, 0.4 g rhodium (in form of rhodium-2-ethylhexanoate) and 0.2 g 1-ethoxy-1,2-diphenyl-[1,2-diphosphacyclopenten-(5)-one-(4)]-tricarboxylic acid-(3,3,5)-triethylester and the autoclave contents were heated in presence of CO and $H_2$ in a ratio of 1:1 at a pressure of 250° at to 170° C. 400 g hexene-1 were introduced into the autoclave with a pressure dosing pump. The synthesis gas consumed during the course of the reaction was continuously replenished by means of an automatic pressure regulating equipment, so that pressure drop in the autoclave was prevented. The course of the reaction was controlled by regular sampling and gas chromatographic analysis. After a conversion time of two hours the autoclave was discharged and the composition of the reaction product was determined by vacuum distillation and gas-chromatographic analysis. More than 95 percent of the converted hexene-(1) were present as n- and i-heptanal respectively.

CONTINUOUS PROCESS

In examples 19 and 20, the continuous performance of the hydroformylation reaction with the process according to the invention is illustrated, whereby the hereinafter described apparatus, shown in the attached drawing, was used.

To a reactor 4, olefin, synthesis gas (CO to $H_2 = 1:1$) and catalyst were introduced through conduits 1, 2 and 3. The reaction products were discharged from the reaction vessel through conduit 5 and introduced into sump area 7 of a distillation column 6. The components of the reaction product being distilled off from the column are led via cooler 8 to a separator 9 and may be recirculated by means of a pump 10 as reflux to head 11 of column 6 or discharged at 12. High boiling constituents of the reaction product containing the hydroformylation catalyst remain in the sump area 7 of column 6. This catalyst containing the remainder is recirculated to reactor 4 by means of pump 13. Fresh catalyst is introduced via conduit 16. Residual gas from distillation column 6 is expanded through conduit 17 or is recirculated via circulating pump 14 to sump area 7. During the course of the test reaction the liquid level in the sump space is maintained constant by continuous removal of sump product via conduit 15.

EXAMPLE 19

In reactor 4, 3.5 kg commercially available propylene per hour (corresponding to an average residence time of 45 minutes) are reacted with carbon moxide and hydrogen (ratio 1:1) in presence of dicobaltoctacarbonyl and 1-ethoxy-1, 2-diphenyl-[1,2-diphosphacyclopenten-(5)-one-(4)]-tricarboxylic acid-(3,3,5)-triethylester at 160° C and 240 Atm. pressure. The atomic ratio of cobalt to phosphorus in the catalyst system amounted to 1:1.1. The catalyst is dissolved in higher boiling components of the reaction product (concentration 4.1 g Co/l) and is recirculated in an amount of 9 l solution/h. The necessary replenishment with fresh catalyst amounts to 0.03 weight percent Co related to the propylene charged. The resulting raw hydroformylation product was fractionated in column 6 at a bottom temperature of 156° C, a distillation pressure of 10 Atm. and a gas recycle of 13 $Nm^3$. As reaction product 5 kg/h of a distillate of the following composition was obtained.

| | |
|---|---|
| aldehydes | 90.8% |
| formic acid esters | 0.4% |
| alcohols | 4.0% |
| higher boiling components | 4.8% |

EXAMPLE 20

1.0 kg commercially available propylene were introduced per hour into reactor 4 and reacted with carbon monoxide and hydrogen (ratio 1:1) in presence of dicobaltoctacarbonyl and 1-ethoxy-,1,2-di-(4'-dimethyl-aminophenyl)-[1,2-diphosphacyclopenten-(5)-one-(4)]-tricarboxylic acid-(3,3,5)-triethylester at 110° C and 250 Atm. pressure. The atomic ratio of cobalt and phosphorus in the catalyst system amounted to 1:1. The catalyst is dissolved in higher boiling components of the reaction product (concentration 4.4 g Co/l) and was recirculated in an amount of 12.5 l solution/h. The necessary replenishment with fresh catalyst amounted to 0.007 weight percent Co, related to the propylene charged. The processing of the raw hydroformylation product was performed with the procedure described in Example 19, except that a gas recirculation of 4 $Nm^3$/h was maintained. As reaction product about 1.5 kg/h of a distillate of the following composition was obtained.

| | |
|---|---|
| aldehydes | 91.6% |
| formic acid esters | 1.0% |
| alcohols | 3.1% |
| Higher boiling components | 4.3% |

What is claimed is:

1. In a process of producing aldehydes by reaction of olefins with carbon monoxide and hydrogen at elevated temperature and elevated pressure in the presence of a metal of Group VIII of the periodic system as catalyst for the reaction, the improvement which comprises employing said catalyst in combination with the reaction product of malonic acid diester with trivalent phosphorus compound having two halogen atoms linked directly to phosphorus, and has a third substituent directly linked to the phosphorus:

$$-(A)_n - R_9$$

wherein $R_9$ is alkyl or

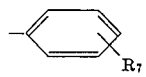

wherein $R_7$ is hydrogen, halo, alkyl, or amino, A is oxygen or nitrogen, and $n$ is 0 or 1.

2. Process according to claim 1, wherein $R_7$ is in the para position and is hydrogen, chloro, alkyl, or dialkylamino and the malonic acid diester is a di-lower alkyl ester.

3. Process according to claim 2, wherein $n$ is 0.

4. In a process of producing aldehydes by reaction of olefin with carbon monoxide and hydrogen at elevated temperature and elevated pressure in presence of a Group VIII metal selected from the group consisting of cobalt, rhodium and ruthenium as catalyst for the reaction, the improvement which comprises employing said catalyst in combination with derivatives of the compound 1,2-diphosphacyclopenten-(5)-one-(4) of the formula:

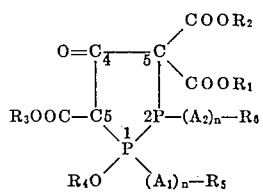

wherein each $R_1$, $R_2$, $R_3$ and $R_4$ is lower alkyl; each $R_5$ and $R_6$ is lower alkyl or a phenyl group of the formula:

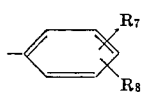

wherein each $R_7$ and $R_8$ is hydrogen, halo, lower alkyl, amino, lower alkyl-amino or di-lower alkylamino; each $A_1$ and $A_2$ is oxygen, imido or lower alkyl substituted imido, and $n$ is 0 or 1.

5. Process according to claim 4, in which said compound is of the formulas:

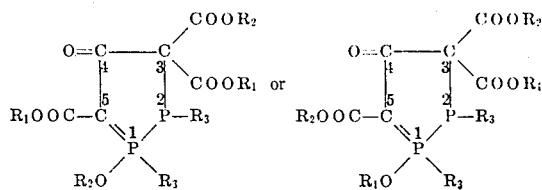

wherein $R_1$, $R_2$, and $R_3$ represent similar or different or substituted aliphatic, or aromatic radicals.

6. Process according to claim 4, in which said compound is of the formula:

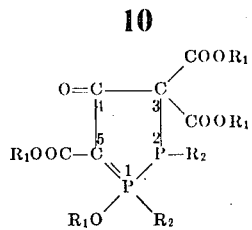

wherein $R_1$ and $R_2$ represent similar or different, aliphatic, or aromatic radicals.

7. Process according to claim 1, wherein said compound is 1-ethoxy-1,2-diphenyl-[1,2-diphosphacyclopenten-(5)-one-(4)]-tricarboxylic acid-(3,3,5)-triethylester.

8. Process according to claim 1, wherein said compound is 1-ethoxy-1,2-di-(4'-chloro-phenyl)-[1,2-diphosphacyclopenten-(5)-one-(4)]-tricarboxylic acid-(3,3,5)-triethylester.

9. Process according to claim 1, wherein said compound is 1-ethoxy-1,2-di-(4'-methyl-phenyl)-[1,2-diphosphacyclopenten-(5)-one-(4)]-tricarboxylic acid-(3,3,5)-triethylester.

10. Process according to claim 1, wherein said compound is 1-ethoxy-1,2-di-(4'-dimethylamino-phenyl)-[1,2-diphosphacyclopenten-(5)-one-(4)]-tricarboxylic acid-(3,3,5)-triethylester.

11. Process according to claim 1, wherein said compound is 1-ethoxy-1,2-di-(4'-fluoro-phenyl)-[1,2-diphosphacyclopenten-(5)-one-(4)]-tricarboxylic acid-(3,3,5)-triethylester.

12. Process according to claim 1, wherein said compound is 1-ethoxy-1,2-di-(2'-tert.-butyl-phenoxy)-[1,2-diphosphacyclopenten-(5)-one-()-one-(4)]-tricarboxylic acid-(3,3,5)triethylester.

13. Process according to claim 1, wherein said compound is 1-ethoxy-1,2-di-(2',5'-dimethyl-phenyl)-[1,2-diphosphacyclopenten-(5)-one-(4)]-tricarboxylic acid-(3,3,5)-triethylester.

14. Process according to claim 1, wherein said compound is 1-ethoxy-1,2-di-(N-methyl-anilino)-[1,2-diphosphacyclopenten-(5)-one-(4)]-tricarboxylic acid-(3,3,5)-triethylester.

15. Process according to claim 1, wherein said compound is 1-methoxy-1,2-diphenyl-[1,2-diphosphacyclopenten-(5)-one-(4)]-tricarboxylic acid-(3,3,5)-trimethylester.

16. Process according to claim 1, wherein said compound is 1-tert.-butoxy-1,2-diphenyl-[1,2-diphosphacyclopenten-(5)-one-(4)]-tricarboxylic acid-(3,3,5)tri-tert.-butylester.

17. Process according to claim 1, wherein said compound is 1-tert.-butoxy-1,2-di-(4'dimethylamino-phenyl)-[1,2-diphosphacyclopenten-(5)-one-(4)]-tricarboxylic acid-(3,3,5)-tri-tert.-butylester.

18. Process according to claim 1, wherein said compound is 1-ethoxy-1,2-di-n-butyl-[1,2-diphosphacyclopenten-(5)-one-(4)]-tricarboxylic acid-(3,3,5)-triethylester.

19. Process according to claim 1, wherein said catalyst includes alkalihydroxide.

20. Process according to claim 1, wherein said catalyst includes at least one tertiary amine.

21. Process according to claim 20, said tertiary amine being triethylamine.

22. Process according to claim 1, wherein cobalt is the Group VIII metal.

23. Process according to claim 1, wherein rhodium is the Group VIII metal.

24. Process according to claim 1, wherein ruthenium is the Group VIII metal.

25. Process according to claim 1, wherein an atomic ratio of Group VIII metal to phosphorus of 1:0.5 to 1:10 is maintained.

26. Process according to claim 4, wherein:

a. the temperature is about 70° to 250° C,
b. the pressure is about 50 to 400 atm.,
c. the atomic ratio of said Group VIII metal to phosphorus is 1:0.5 to 1:10,
d. said Group VIII metal is cobalt, rhodium, or ruthenium or.

* * * * *

UNITED STATES PATENT OFFICE
CERTIFICATE OF CORRECTION

Patent No. 3,681,465  Dated August 1, 1972

Inventor(s) Jurgen Falbe et al.

It is certified that error appears in the above-identified patent and that said Letters Patent are hereby corrected as shown below:

Col. 3, lines 15-20, change the formula to:

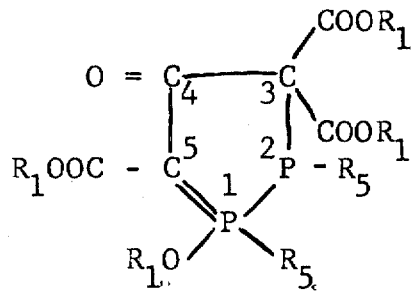

Col. 9, lines 64 & 65, (Claim 5, lines 4 and 5) cancel "or substituted".

Col. 10, (Claim 12, line 3) cancel "()-one-".

Col. 12, line 6, (Claim 26, line 7) cancel "or".

Signed and sealed this 15th day of May 1973.

(SEAL)
Attest:

EDWARD M. FLETCHER, JR.
Attesting Officer

ROBERT GOTTSCHALK
Commissioner of Patents